United States Patent [19]

Huignard et al.

[11] Patent Number: 5,072,135
[45] Date of Patent: Dec. 10, 1991

[54] POWER LASER PULSE GENERATOR

[75] Inventors: Jean-Pierre Huignard; Jean-Luc Ayral, both of Paris; Patrice Jano, Seine Port, all of France

[73] Assignee: Thomson-CSF, Puteaux, France

[21] Appl. No.: 549,120

[22] Filed: Jul. 6, 1990

[30] Foreign Application Priority Data

Jul. 18, 1989 [FR] France .................. 89 09632

[51] Int. Cl.⁵ .................................. H03F 7/00
[52] U.S. Cl. .......................... 359/327; 372/3;
372/12; 372/94; 359/326; 359/330; 359/333
[58] Field of Search ............. 372/3, 10, 12, 18, 21,
372/25, 29, 30, 70, 93, 94, 105, 108; 330/4.3;
307/426, 424, 425, 428

[56] References Cited

U.S. PATENT DOCUMENTS

| | | | |
|---|---|---|---|
| 4,380,073 | 4/1983 | Wayne | 372/12 |
| 4,394,623 | 7/1983 | Kurnit | 330/4.3 |
| 4,429,393 | 1/1984 | Giuliano | 372/21 |
| 4,485,473 | 11/1984 | Tang et al. | 372/18 |
| 4,529,943 | 7/1985 | George et al. | 330/4.3 |
| 4,546,477 | 10/1985 | Richards | 372/12 |
| 4,649,544 | 3/1987 | Haas et al. | 372/22 |
| 4,670,972 | 6/1987 | Sakakima | 29/603 |
| 4,685,107 | 8/1987 | Kafka et al. | 372/6 |
| 4,730,105 | 3/1988 | Mitschke et al. | 250/205 |
| 4,794,598 | 12/1988 | Desuruire et al. | 372/3 |
| 4,933,943 | 6/1990 | Narhi et al. | 372/3 |
| 4,969,156 | 11/1990 | Schiller et al. | 372/93 |

FOREIGN PATENT DOCUMENTS

| | | |
|---|---|---|
| 0152326 | 1/1985 | European Pat. Off. . |
| 0262028 | 9/1987 | European Pat. Off. . |
| 0253590 | 1/1988 | European Pat. Off. . |
| 1272521 | 6/1960 | France . |
| 2586306 | 2/1987 | France . |
| 8714820 | 10/1987 | France . |
| 55-64626 | 5/1980 | Japan . |
| 56-65325 | 6/1981 | Japan . |
| 57-26412 | 2/1982 | Japan . |
| 60-187907 | 9/1985 | Japan . |
| 61-151818 | 7/1986 | Japan . |

OTHER PUBLICATIONS

Japanese Journal of Applied Physics, vol. 20, No. 12, Tokyo, Japan, pp. L877–L880, Dec. 1981, M. Tanimoto et al., "Laser Power Multiplication in a Parametric Frequency Converter with a Cavity Dumper".

Primary Examiner—William L. Sikes
Assistant Examiner—Galen J. Hansen
Attorney, Agent, or Firm—Oblon, Spivak, McClelland, Maier & Neustadt

[57] ABSTRACT

Disclosed is a laser pulse generator in which a single pulse is generated from a train of pulses. The amplitude of this single pulse is the addition of the amplitudes of the pulses of the train of pulses. This addition is done in a non-linear crystal inserted in an optical loop. The train of pulses takes the place of a pump wave applied to the non-linear crystal and the signal circulating in the optical loop takes the place of a signal wave. This signal wave therefore benefits from a transfer of energy coming from the pump wave because of the interaction in the non-linear crystal.

9 Claims, 4 Drawing Sheets

POWER LASER PULSE GENERATOR

BACKGROUND OF THE INVENTION

1. Field of the Invention

The invention concerns a power laser pulse generator and, notably, a generator giving one pulse from several pulses.

2. Description of the Prior Art

Presently known power lasers generate pulse trains with a peak power that is as yet insufficient.

For example, the pulses emitted by a FEL (free-electron laser), as shown in FIG. 1, typically have the following characteristics:

Micropulses with $t = 40$ $\mu$s;
Peak power of the micropulse: $I_c = 200$ MW
Distance between micropulses: $T = 100$ ns;
Number of micropulses: $N = 2.10^3$
Wavelength: near IR.

In certain applications, it is desired to obtain a peak power higher than that obtained by means of a FEL laser, for example by generating a single pulse, but one having a peak intensity that is N times the intensity of a pulse (see FIG. 2). N is the number of micropulses contained in the pulse emitted by the FEL ($N = 10^3$).

The invention concerns a device that enables the adding up of N micropulses of a train of pulses to give a single pulse of greater amplitude.

The means implemented to obtain this addition of pulses in a single pulse are compatible with the power densities brought into play in lasers of this type. In particular, the device of the invention excludes the use of components that absorb a component of polarization and enable adaptation to wide-diameter beams in order to reduce the power densities on optical windows and mirrors.

SUMMARY OF THE INVENTION

The invention therefore concerns a power laser pulse generator comprising:
- a laser source emitting at least one pulse train with a period t;
- a ring-shaped optical cavity with a length proportional to the period t of the pulse train;
- a non-linear medium inserted in the ring of the optical cavity receiving the pulse train that acts as a pump beam for the non-linear medium, with the light circulating in the cavity acting as a signal beam;
- means that are integrated into the optical cavity and act at determined instants to extract a light pulse from the optical cavity.

BRIEF DESCRIPTION OF THE DRAWINGS

Different objects and characteristics of the invention will appear more clearly from the following description, which is given as an example, in referring to the appended drawings of which.

DETAILED DESCRIPTION OF THE INVENTION

Figure 3:
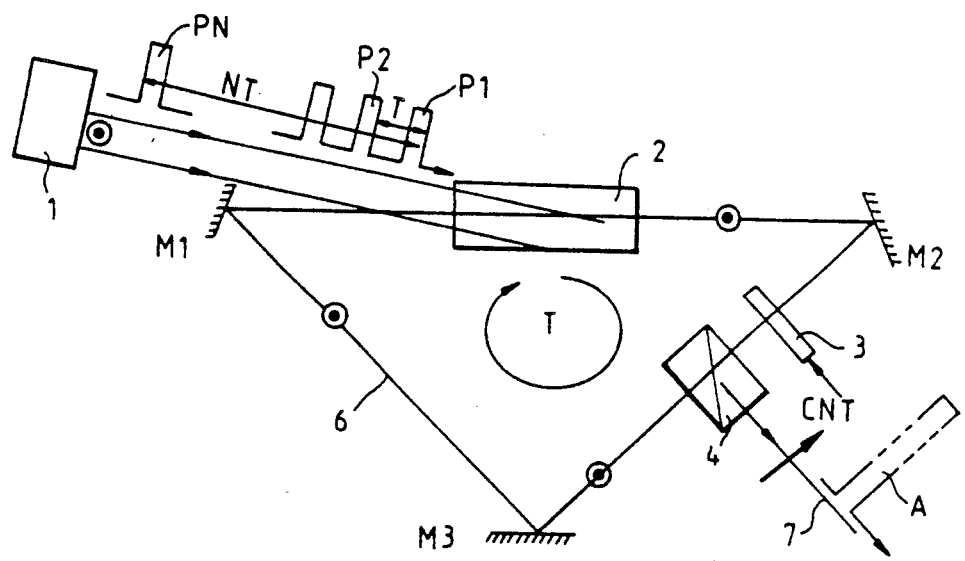
FIG. 3 exemplifies an embodiment of the laser according to the invention.

The device that is an object of the invention is shown in FIG. 3. It uses the following main components:
- a light source 1 emitting a train of pulses;
- a ring-shaped cavity 6;
- a non-linear medium 2 of the Raman gas cell type (with third order non-linearity);
- an electro-optical polarization switch 3, 4 enabling the pulse to be extracted from the cavity.

The light source emits a pulse train of linearly polarized light. As shown in FIG. 3, this linear polarization is oriented in a direction indicated by the sign represented as a circle containing a dot.

This pulse train has N pulses with a period T and a duration t. The total duration of a pulse train is NT.

The optical path length of the ring-shaped cavity 6 is such that a light pulse takes a time T (equal to the period of the pulses of the pulse train) to travel through the ring. For example, this cavity is made by means of mirrors M1, M2, M3.

The non-linear medium 2 receives pulses from the pulse train. These pulses take the place of a pump beam for the non-linear medium 2. A signal wave circulating in the cavity, arriving coincidentally with a pump beam in the non-linear medium, will benefit from a transfer of energy from the pump beam to the signal beam.

The electro-optical switch comprises an electro-optical polarization switching device 3 with the role of making the direction of polarization of the light that it receives rotate by 90°.

The electro-optical switch 3 is, for example, based on $KTiPO_4$ (called KTP) or $KH_2PO_4$ (called KDP) or $LiNbO_3$.

A birefringent device is associated with this electro-optical switch 3. This birefringent device transmits the polarized light as it is transmitted by the non-linear medium 2, along the path of the ring 6, and it reflects the light polarized by 90° in a direction 7.

Figure 4:
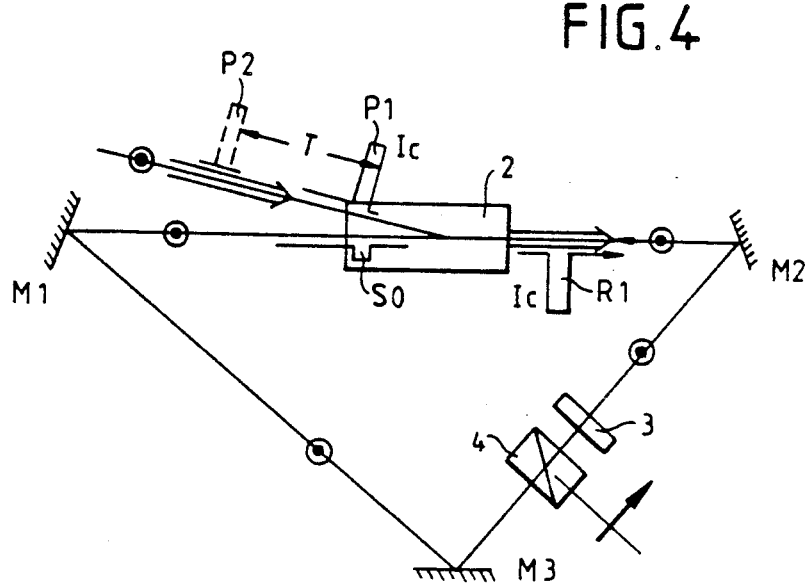
FIGS. 4 and 5 show modes of operation of the device of FIG. 3.

The device of the invention works as shown in FIG. 4.

A first pulse P1 penetrates the ring-shaped cavity 6 by means of the non-linear medium 2. For example, when the device is started up, the pulse P1, taking the place of a pump wave, enables the amplification of a noise signal SO pre-existent in the optical cavity. The creation of the noise signal SO can be inherent to the system. For example, the noise signal can enter the optical cavity by way of a leakage. We then have a mixture of two waves and an amplification by Raman effect.

The amplitude of the resultant pulse R1 is substantially the amplitude $I_c$ of the pulse P1 if the amplitude of the noise signal SO is considered to be low.

This pulse travels through the ring 6 of the cavity by successive reflections on the mirrors M2, M3, M1.

Figure 5:
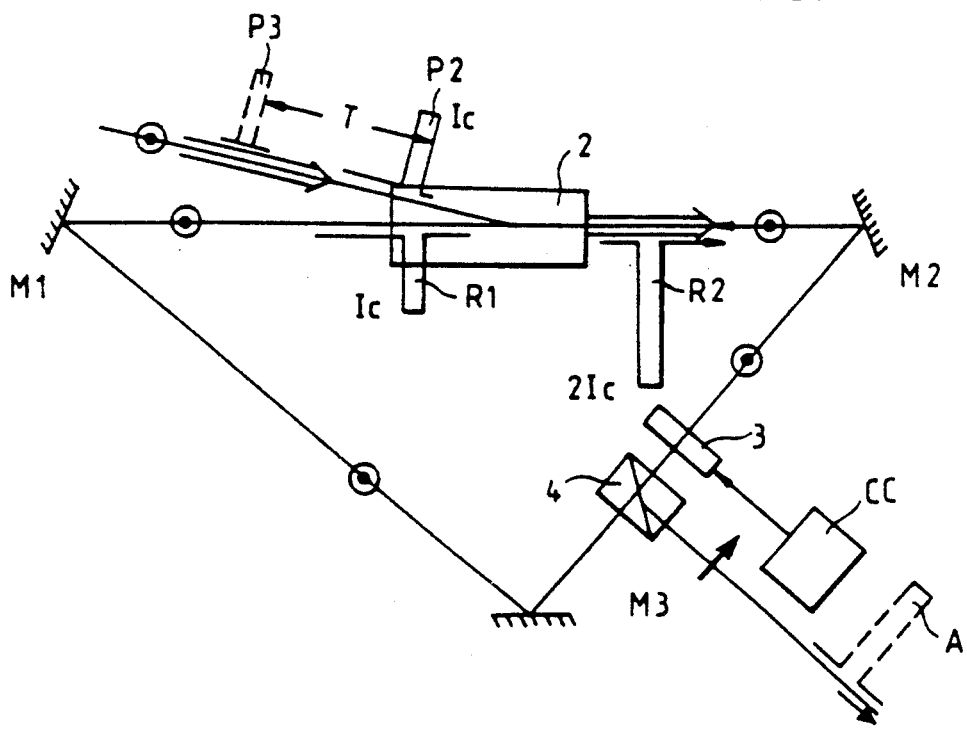

The delay given by the cavity or the time taken by the pulse R1 to travel through the ring 6 is equal to T. Thus, as shown in FIG. 5, the pulse R1 reaches the non-linear medium 2 at the instant when another pulse P2 also reaches this same medium. By Raman effect, there is a transfer of energy from the pulse P2 (pump wave) to the pulse R1 (signal wave). The resultant pulse R2 substantially has an amplitude of a value $2I_c$.

The process thus described may reproduce itself several times and the resultant pulse, at the output of the non-linear medium 2, is amplified at each coincidence of an R1 type pulse and a P2 type pulse, by the value of a pulse such as P2.

The width of the pulse circulating in the ring-shaped cavity 6 remains unchanged (for example, t=4 ps).

By contrast, the peak power of the resultant pulse is multiplied by N at the nth pulse PN.

Thus, a single pulse is obtained with a peak power of $NI_c$ and with a width equal to that of the initial pulse.

This intracavity pulse can be extracted by means of a polarization-switching electro-optical device followed by a birefringent element (or dielectric mirror with a coefficient of reflection that depends on the azimuth of polarization of the incident wave, for R=0 for E// and R=Rmax for E).

Figure 1:
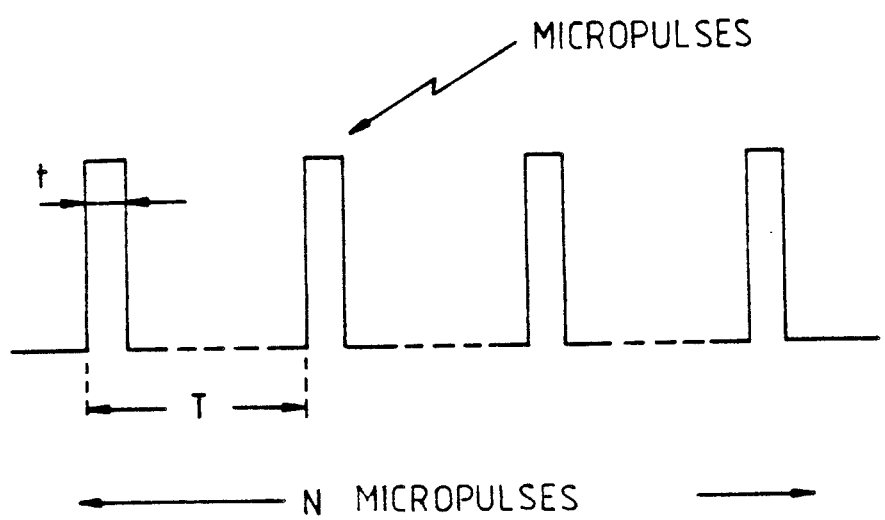
FIG. 1 shows a graph of the train of pulses emitted by an FEL.
Figure 2:
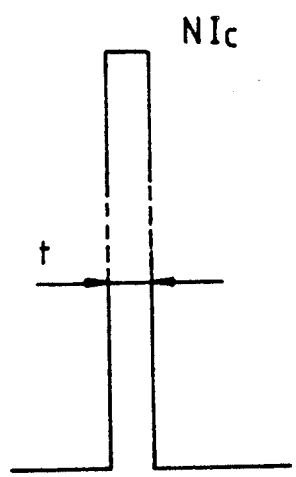
FIG. 2 shows a single pulse emitted by the laser according to the invention.

According to the diagrams of FIGS. 2 to 4, the beam coming from the FEL (perpendicular polarization) is incident to the non-linear medium 2 used in the pump-probe configuration.

The polarization-switching electro-optical device 3 works under the control of a control device CC at determined times enabling the extraction of a pulse such as R2. For example, if a pulse with a peak power multiplied by N is desired, the electro-optical device 3 will be actuated at intervals of NT. The direction of polarization of the pulse to be extracted will then undergo a rotation of 90°. It will therefore be then reflected by the birefringent device 4 in the direction 7.

As regards the non-linear medium 2, it must be specified that the Raman interactions in the gases are the non-linear mechanisms best suited to the amplification and transfer of energy in short pulses (ps) by the mixing of two pump-probe waves. The characteristics of a Raman amplifier cell are typically as follows:

non-linear medium: $CH_4$
Raman non-linearity threshold: 1 cm $Jcm^{-2}$
gas pressure: 50 bars
gain coefficient: $X \times 10^{12}$ m $W^{-1}$
response time: 10 ps
frequency shift: 3000 $cm^{-1}$ The ring-shaped resonator is formed by three mirrors with maximum reflection at the wavelength emitted by the non-linear medium 2.

The polarization switch 3 may be of the KDP or KTP or $LiNbO_3$ type, with a response time that is shorter than the duration of a pulse.

An assessment has been made of the gain in peak power of a resultant pulse, taking account of the losses in reflection and diffraction at each mirror of the cavity, which we have fixed at about 1% per mirror.

Figure 6:
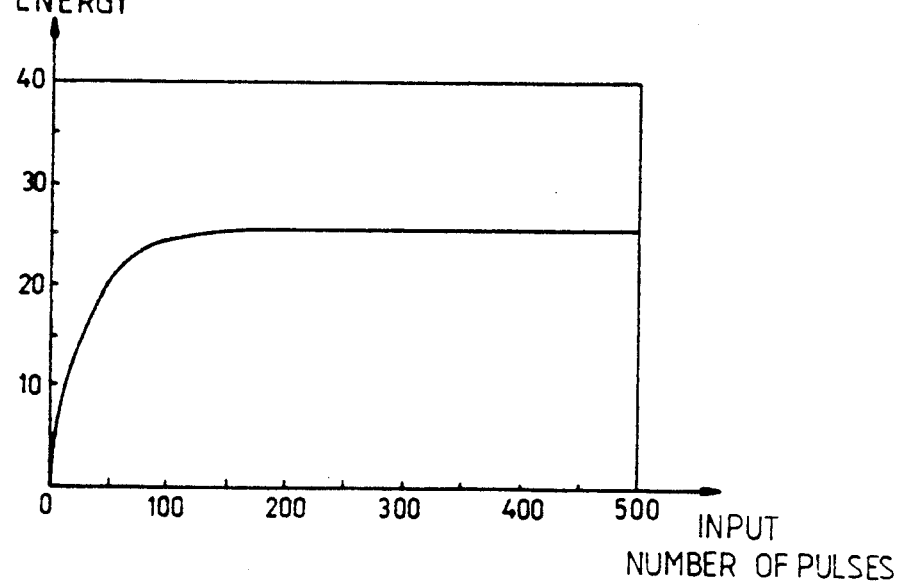
FIG. 6 is an exemplary graph of amplification of the device of the invention.

The Raman medium is $CH_4$ gas under pressure. If the wavelength of the pulse train is 1 μm, the wavelength of the pulse stored in the cavity is then 1.5 μm. The transfer of energy from the pulse train is done in saturation mode and, therefore, has very high efficiency of the order of 80%. FIG. 6 is a graph representing the energy stored in the cavity as a function of the number of pulses of the train of pulses received. It is seen that this energy reaches saturation starting from a number of pulses that is greater than 100. In this case, the overall efficiency of the energy transfer is about 25%. The peak power of the giant pulse thus created is 25 times that of the input micropulse (200 MW), giving 5 GW. We thus obtain a peak power that is notably amplified.

Figure 7:
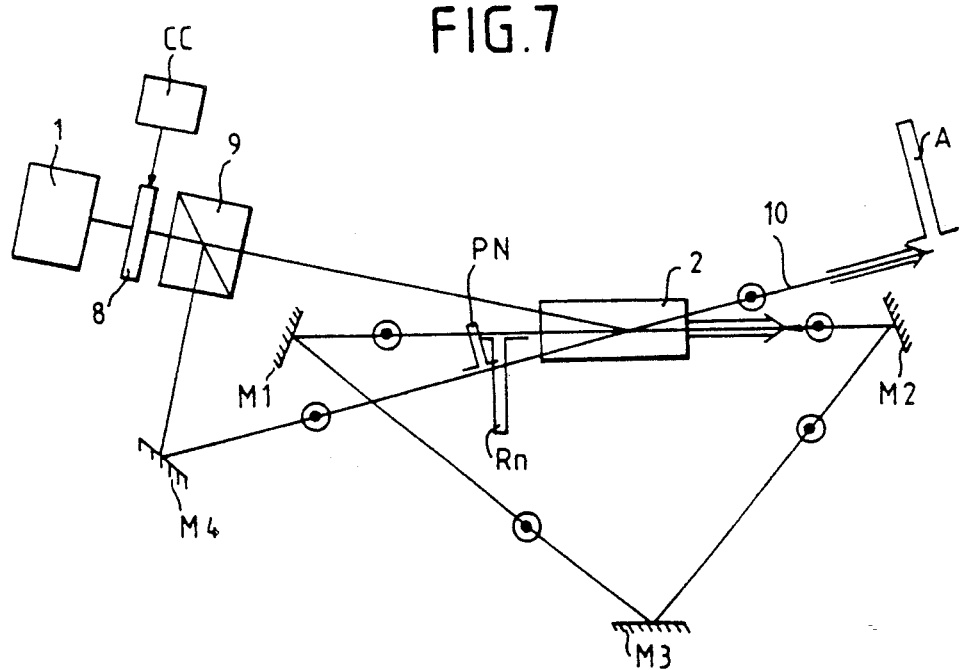
FIGS. 7 and 8 show alternative embodiments of the device of the invention.

According to one variant of the invention, in order to avoid the use of electro-optical polarization switches and birefringent components in the optical cavity 6, it may be desirable to extract the energy from the cavity by a non-linear interaction of two waves shown in FIG. 7. According to this system, the last micropulse PN is directed by polarization-switching in the angular direction that is symmetrical respect to the pump wave circulating in the cavity. This wave is shifted in frequency and, after two-wave interaction, the intracavity circulating energy is transferred to the new direction 10 of the pump wave.

FIG. 7 therefore shows a polarization-switching device 8 placed in the path of the pulses coming from the source 1. A birefringent device 9 enables the transmission of the pulses from the source 1 either directly to the non-linear medium 2 as described above or through a mirror M4. When it is sought to extract a pulse from the cavity 6, the control circuit CC actuates the rotation, by 90°, of the direction of polarization of at least one pulse PN.

The birefringent device 9 reflects this pulse PN, by means of the mirror M4, at an angle with respect to the direction, in the medium 2, of the path of the intracavity pulses, such that this pulse PN takes the place of a signal wave. A pulse Rn arriving coincidentally in the medium 2 then takes the place of a pump wave and a transfer of energy takes place from the pulse Rn towards the pulse PN. It is thus possible to extract an amplified pulse A, along a direction 10 located in the extension of the direction of the pulse PN.

Figure 8:
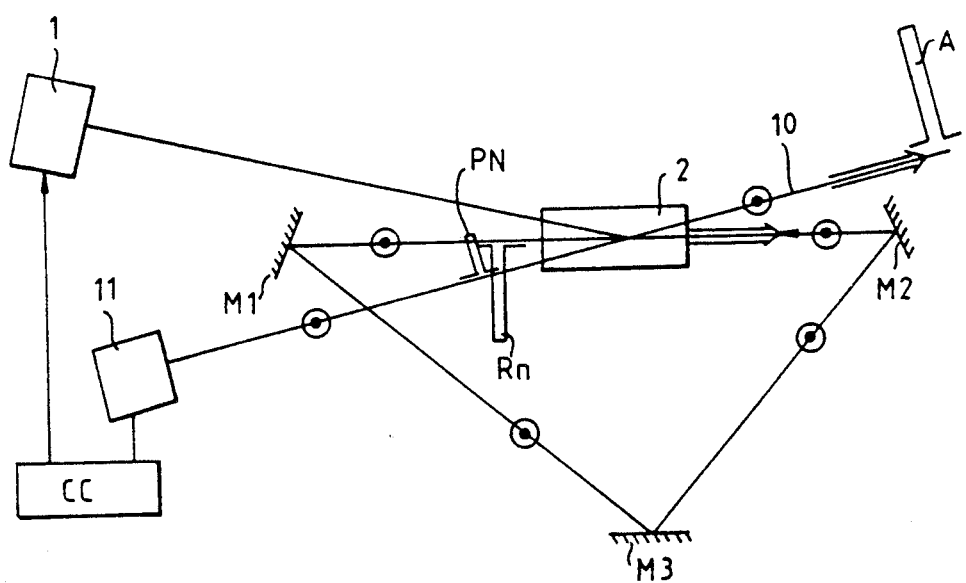

In an equivalent way, energy may be extracted from the cavity as shown in FIG. 8 by means of another laser source 11 emitting a single low-energy pulse. The non-linear medium transfers the intracavity energy towards this probe beam. The incidence and the frequency of this laser are chosen to optimize the gain of the two-wave interaction. The sources 1 and 11 are controlled by a control circuit CC so that the pulses from the source 1 enable the amplification of an intracavity pulse and so that the pulses from the source 11 make it possible, as shown in FIG. 8 and as stated above, to extract an amplified pulse at a determined instant.

In the foregoing, it has been assumed that the light source 1 emits linearly polarized light. In the different branches of the optical circuit of the figures that have just been described, the direction of polarization is indicated by a small circle containing a dot and the different directions of polarization are parallel to one another.

The present device therefore makes it possible to generate a single laser pulse from a train of N micropulses. The peak power of the pulse is, under these conditions, equal to N times the peak power of the elementary pulse. The invention can be applied to optronic devices requiring very high peak power lasers (FEL type lasers or mode-locking solid lasers: 10 to 100 ps pulses separated by 10 ns).

It is quite clear that the above description has been given as a non-restrictive example and that other variants can be considered without going beyond the scope of the invention. The numerical examples and the nature of the materials indicated have been given purely to illustrate the description.

We claim:

1. A power laser pulse generator comprising:
   a laser source emitting at least one pulse train of light with a period t;
   a ring-shaped optical cavity for circulating light, the cavity having a length proportional to the period t of the pulse train;

a non-linear medium inserted in the ring of the optical cavity for receiving the pulse train, the pulse train acting as a pump beam for the non-linear medium, and light circulating in the cavity acting as a signal, pulse beam;

means for initiating the circulating light as a noise signal circulating in said optical cavity prior to emission of said at least one pulse train by the laser source; and extraction means operated at determined instants, to extract a light pulse from the optical cavity, the extraction means comprising an optical switch including an electro-optical polarization switch controlled by a control circuit and a birefringent device.

2. A pulse generator according to claim 1, wherein the extraction means is integrated in the ring of the optical cavity with the optical switch inserted in the ring of the optical cavity.

3. A pulse generator according to claim 2, wherein the optical switch includes, in series in the optical cavity, the electro-optical polarization switch controlled by the control circuit and the birefringent device.

4. A pulse generator according to claim 3, wherein the electro-optical polarization switch is based on KDP, KTP or LiNbO$_3$.

5. A pulse generator according to claim 1, wherein the non-linear medium is a cell of gas under pressure.

6. A pulse generator according to claim 5, wherein the gas of the cell under pressure is CH$_4$.

7. A pulse generator according to claim 1, wherein the laser source emits pulses of linearly polarized light.

8. A power laser pulse generator comprising:

a laser source emitting at least one pulse train of light with a period t;

a ring-shaped optical cavity for circulating light, the cavity having a length proportional to the period t of the pulse train;

a non-linear medium inserted n the optical cavity for receiving the pulse train directly from the laser source, the pulse train acting as a pump beam for the non-linear medium, and light circulating in the cavity acting as a signal pulse;

means for initiating the circulating light as a noise signal circulating in said optical cavity prior to emission of said at least one pulse train by the laser source; and extraction means, operated at determined instants, for extracting a light pulse from the optical cavity;

wherein said extraction means includes an electro-optical polarization switch mean for redirecting at least one pulse from each of said at least one pulse train, under the control of a control circuit, to the non-linear medium at an angle such that the redirected at least one pulse functions as a signal beam while the signal pulse circulating in the optical cavity functions as a pump beam, an energy transfer taking place from the signal pulse of the cavity towards the redirected at least one pulse of the source.

9. A power laser pulse generator comprising:

a laser source emitting at least one pulse train of light with a period t;

a ring-shaped optical cavity for circulating light, the cavity having a length proportional to the period t of the pulse train;

a non-linear medium inserted in the optical cavity for receiving the pulse train directly from the laser source, the pulse train acting as a pump beam for the non-linear medium, and light circulating in the cavity acting as a signal pulse;

means for initiating the circulating light as a noise signal circulating in said optical cavity prior to emission of said at least one pulse train by the laser source; and extraction means, operated at determined instants, for extracting a light pulse from the optical cavity;

wherein said extraction means includes a supplementary laser source for emitting laser pulses towards the non-linear medium at an angle such that these pulses function as a signal beam and such that the signal pulse circulating in the optical cavity functions as a pump beam, with a control circuit selectively controlling the laser source and the supplementary laser source.

* * * * *